US008449644B2

(12) United States Patent
Kikuchi et al.

(10) Patent No.: US 8,449,644 B2
(45) Date of Patent: May 28, 2013

(54) SILICON CARBIDE POROUS BODY

(75) Inventors: Yoshio Kikuchi, Nagoya (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/779,215

(22) Filed: May 13, 2010

(65) Prior Publication Data

US 2010/0218473 A1    Sep. 2, 2010

Related U.S. Application Data

(63) Continuation of application No. PCT/JP2008/071619, filed on Nov. 28, 2008.

(30) Foreign Application Priority Data

Nov. 30, 2007  (JP) .................. 2007-309933

(51) Int. Cl.
  *B01D 39/06*  (2006.01)
  *B01D 24/00*  (2006.01)
  *B01D 39/14*  (2006.01)
  *F01N 3/00*  (2006.01)

(52) U.S. Cl.
  USPC ............ 55/523; 55/522; 55/524; 422/169; 422/170; 422/171; 422/172; 422/179; 422/180; 422/181; 422/182; 422/177; 422/178; 60/297

(58) Field of Classification Search
  USPC   55/522–524; 422/169–172, 177–182; 60/297
  See application file for complete search history.

(56) References Cited

U.S. PATENT DOCUMENTS

| 5,380,506 | A  | * | 1/1995  | Taylor, Jr. ............. 423/213.2 |
| 6,803,086 | B2 | * | 10/2004 | Noguchi et al. .......... 428/116 |
| 7,112,233 | B2 | * | 9/2006  | Ohno et al. ................ 55/523 |
| 2002/0180117 | A1 | * | 12/2002 | Yamamoto et al. ....... 264/630 |
| 2003/0021949 | A1 |   | 1/2003  | Tomita et al. |
| 2003/0108458 | A1 |   | 6/2003  | Ichikawa et al. |
| 2003/0110744 | A1 | * | 6/2003  | Gadkaree et al. ............. 55/523 |
| 2003/0148063 | A1 |   | 8/2003  | Morimoto et al. |
| 2004/0065068 | A1 | * | 4/2004  | Otsubo et al. ............. 55/523 |
| 2005/0143255 | A1 |   | 6/2005  | Morimoto et al. |
| 2005/0210848 | A1 | * | 9/2005  | Kuki et al. ................ 55/523 |
| 2006/0121239 | A1 | * | 6/2006  | Furukawa et al. .......... 428/116 |
| 2007/0140928 | A1 | * | 6/2007  | Beall et al. ............... 422/177 |
| 2009/0065982 | A1 |   | 3/2009  | Morimoto et al. |

FOREIGN PATENT DOCUMENTS

| JP | 61-026550 A1 | 2/1986 |
| JP | 61-013845 B2 | 4/1986 |
| JP | 61-013846 B2 | 4/1986 |
| JP | 06-182228 A1 | 7/1994 |
| JP | 08-165171 A1 | 6/1996 |
| JP | 2001-199777 A1 | 7/2001 |
| JP | 2002-154882 A1 | 5/2002 |
| JP | 2002-234779 A1 | 8/2002 |
| JP | 2003-103285 A1 | 4/2003 |
| JP | 2003-292388 A1 | 10/2003 |
| WO | 02/070433 A1 | 9/2002 |

OTHER PUBLICATIONS

European Patent Application Publication No. 1 364 930 A1 which corresponds to U.S. Patent Application Publication No. 2003/0108458 A1 and Japanese Patent Publication No. 2002-234779.
European Patent Application Publication No. 1 364 928 A1 corresponds to U.S. Patent Application Publication No. 2003/0148063 A1 and International Publication No. WO 2002/070433 A1.
European Patent Application Publication No. 1 493 724 A1 corresponds to U.S. Patent Application Publication No. 2005/0143255 A1 and Japanese Patent Publication No. 2003-292388 A1.
Extended European Search Report dated Jun. 19, 2012.

* cited by examiner

*Primary Examiner* — Amber Orlando
(74) *Attorney, Agent, or Firm* — Burr & Brown

(57) ABSTRACT

There is provided a silicon carbide porous article containing silicon carbide particles as an aggregate and an oxide as a bonding material. The silicon carbide particles are bonded together in a state that pores are held among the silicon carbide particles, and an additive amount of the oxide is 0.5 $g/m^2$ or more and below 3.0 $g/m^2$ with respect to a surface area of the silicon carbide particles.

18 Claims, No Drawings

SILICON CARBIDE POROUS BODY

TECHNICAL FIELD

The present invention relates to a silicon carbide porous article. More specifically, the present invention relates to a silicon carbide porous article capable of being suitably used for a DPF (diesel particulate filter).

BACKGROUND OF THE INVENTION

Conventionally, there has widely been used a porous honeycomb structure as a filter for trapping and removing particulate matter contained in a dust-containing fluid such as a diesel engine exhaust gas or as a catalyst carrier for carrying a catalyst component for purifying harmful substances in exhaust gas. In addition, it is known that refractory particles such as silicon carbide (SiC) particles are used as a constituent material for such a honeycomb structure.

As a related art, for example, the Patent Document 1 discloses a honeycomb-structured porous silicon carbide catalyst carrier obtained by using a silicon carbide powder having a predetermined specific surface area and a predetermined impurity content amount as a starting raw material, forming the material into a desired shape, drying the material, and firing the material at 1600 to 2200° C.

On the other hand, the Patent Document 2 discloses a method for manufacturing a vitrifiable material-containing refractory characterized by adding a vitrifiable material to an easily oxidizable material or a refractory composition containing an easily oxidizable material; mixing, kneading, and forming them together with a bonding material; and subjecting the formed article to naked firing in a furnace in a non-oxidation atmosphere. The Patent Document 3 discloses a silicon carbide formed article obtained by adding an organic binder, a clay mineral based inorganic binder, a glass based inorganic binder, and a lithium silicate based inorganic binder to a silicon carbide powder, followed by forming the mixture.

In addition, in the Patent Document 1, as a conventional method for manufacturing a porous silicon carbide sintered article, there is introduced a method where a vitreous flux or a bonding material such as clay was added to silicon carbide particles which will become an aggregate, the mixture is formed, and the formed article is sintered at temperature where the bonding material melts.

Further, the Patent Documents 4 and 5 discloses; regarding a ceramic filter for high temperature, where refractory particles made of silica sand, ceramic ground product, a metal oxide such as $Al_2O_3$, $TiO_2$, or $ZrO_2$, silicon carbide, nitride, boride, another refractory material, or the like and granulated to have a predetermined particle size are formed into a porous bottomed cylindrical article with a refractory bonding material such as liquid glass, frit, or glaze; suitable refractory particle average diameter, refractory particle size distribution, porosity of the cylindrical article, average pore size of the cylindrical article, pore volume of the cylindrical article, partition wall thickness of the cylindrical article, and the like.

In addition, the Patent Document 6 discloses a honeycomb structure where refractory particles such as silicon carbide are bonded with a vitreous component, the honeycomb structure being sufficiently porous, having a high specific surface area, and being suitably used even under a high SV condition as a filter, a catalyst carrier, or the like for purifying automobile exhaust gas and a production method thereof.

On the other hand, the Patent Document 7 discloses a porous honeycomb structure containing refractory particles, particularly silicon carbide and metal silicon, as an aggregate and a production method thereof.

Patent Document 1: JP-A-6-182228
Patent Document 2: JP-A-61-26550
Patent Document 3: JP-A-8-165171
Patent Document 4: JP-B-61-13845
Patent Document 5: JP-B-61-13846
Patent Document 6: JP-A-2001-199777
Patent Document 7: JP-A-2002-154882

SUMMARY OF THE INVENTION

In a sintering configuration (necking) due to a recrystallization reaction of a silicon carbide powder itself shown in the Patent Document 1, a silicon carbide component is evaporated from a surface of a silicon carbide particle and condensed in a contact portion (neck portion) between the particles, thereby growing the neck portion to obtain a bonding state. In order to evaporate silicon carbide, very high firing temperature is required, which invites high cost, and a problem of decrease in the firing yield because a material having high thermal expansion coefficient has to be fired at high temperature.

On the other hand, in the method where a raw material silicon carbide power is bonded with a vitreous material shown in Patent Documents 2, 1, and 6, the firing temperature is as low as 1000 to 1400° C. However, when a sintered article manufactured by this method is used as a material for a diesel particulate filter (DPF) for removing particulate matter contained in exhaust gas discharged from a diesel engine, there arises a problem of fracture due to local heat generation when the particulate matter trapped by and deposited on the filter is tried to be combusted for filter regeneration because of low thermal diffusivity ($m^2/s$) and low heat capacity ($J/K/m^2$) per unit volume of the constituent material. Likewise, in a porous honeycomb structure containing silicon carbide and metal silicon shown in the Patent Document 7, there arises a problem of fracture due to a local heat generation because of small thermal capacity.

Further, though the filters shown in the Patent Documents 4 and 5 are porous, they are bottomed cylindrical articles having thick partition walls having a thickness of 5 to 20 mm, which cannot be applied to a high SV (space velocity) condition such as an automobile exhaust gas purification filter.

The present invention has been made in view of such problems of the prior art and aims to provide a silicon carbide porous article hardly having local heat generation because of high thermal diffusivity ($m^2/s$) and/or high heat capacity ($J/K/m^3$) per unit volume of the constituent material and having various properties required to be used as a DPF.

As a result of the inventors' earnest investigations for achieving the aforementioned aim, they found a silicon carbide porous article having open porosity and average pore diameter applicable to a high SV condition, where the heat capacity can be increased by reducing the addition amount of the bonding material as much as possible, and firing temperature can be lowered by using an oxide having a low melting point as the bonding material, which led to the completion of the present invention.

That is, according to the present invention, there is provided the following silicon carbide porous article.

[1] A silicon carbide porous article containing silicon carbide particles as an aggregate and an oxide as a bonding material, wherein the silicon carbide particles are bonded together in a state that pores are held among the silicon carbide particles, and an additive amount of the oxide is 0.5 g/m² or more and less than 3.0 g/m² with respect to a surface area of the silicon carbide particles.

[2] A silicon carbide porous article according to [1], wherein the oxide includes a Si (silicon) element and further includes at least one selected from the group consisting of alkali earth metals, Y (yttrium), lanthanoid, Zr (zirconium), Ti (titanium), Fe (iron), Co (cobalt), Ni (nickel), and Al (aluminum).

[3] A silicon carbide porous article according to [1] or [2], wherein the oxide contains a crystal phase which is cordierite, aluminum titanate ($Al_2TiO_5$), mullite, zircon, anorthite, strontium feldspar, and sialon.

[4] A silicon carbide porous article according to any one of [1] to [3], wherein the pores have an open porosity of 30 to 75%.

[5] A silicon carbide porous article according to any one of [1] to [4], wherein the pores have an average pore diameter of 5 to 50 μm.

[6] A honeycomb structure constituted of a silicon carbide porous article according to any one of [1] to [5].

[7] A method for manufacturing a silicon carbide porous article according to any one of [1] to [6], wherein, after an oxide raw material is added to a silicon carbide particle raw material and mixed, firing is performed at 1100 to 1600° C.

In a DPF, high porosity is necessary in order to make the pressure loss small. On the other hand, when it has a high porosity, heat capacity per unit volume of the DPF is decreased, and, as a result, there arises a problem of fracture due to local heat generation when particulate matter trapped by and deposited on the filter is tried to be combusted for filter regeneration. Therefore, in order to increase heat capacity per unit volume of a DPF without lowering the porosity, it is necessary to increase heat capacity per unit volume of the constituent material.

Since silicon carbide has a large heat capacity per unit volume and a small thermal expansion coefficient among refractory particles, it is suitable as a DPF constituent material. On the other hand, vitreous material and metal silicon have problems of a small heat capacity per unit volume and a large thermal expansion coefficient in comparison with silicon carbide.

In the present invention, the heat capacity per unit volume of the constituent material can be increased by decreasing the oxide additive amount of a silicon carbide porous article where silicon carbide particles are bonded together with an oxide as much as possible. In addition, the thermal expansion coefficient can be made small. Further, because of a low firing temperature of 1100 to 1600° C. by the use of an oxide having a low melting point, the firing yield can be improved.

DETAILED DESCRIPTION OF THE INVENTION

Hereinbelow, the best mode for carrying out the present invention will be described. However, the present invention is by no means limited to the following embodiment, and it should be understood that an embodiment obtained by adding changes, improvements, and the like to the following embodiment on the basis of a person of ordinary skill within the range of not deviating from the gist of the present invention is included in the range of the present invention.

[1. Silicon Carbide Particle]

In the present invention, silicon carbide (SiC) particles are used as the aggregate. SiC has high thermal resistance and is suitably used for a DPF often exposed to high temperature upon a combustion treatment of depositing particulate matter, or the like.

It is preferable that the silicon carbide particles have an average particle diameter of 10 to 100 μm. Since a honeycomb structure of the present invention has relatively low firing temperature, the particle shape and the particle diameter of the silicon carbide particles are maintained generally until after firing. Therefore, when the average particle diameter is less than 10 μm, the particle diameter is too small with respect to a desired pore size, and, as a result, the pore size of 5 μm or less increases to remarkably raise the pressure loss.

In reverse, when the aforementioned average particle diameter is above 100 μm, the particle diameter of silicon carbide used is too large with respect to the desired pore diameter, and it is difficult to obtain desired pores in the gap among the particles even by densely filling silicon carbide particles at the stage of forming. Further, as a filter, it is not preferable in that it invites decrease in the porosity.

Since the impurities contained in the silicon carbide particle raw material cause descent of the softening point of the bonding material to influence the sintering state, it is preferable to suppress the content to be 5 mass % or less. In particular, regarding an alkali metal, since influence on the descent of the softening point is serious, the content is preferably suppressed to be 1 mass % or less.

[2. Bonding Material]

The oxide usable in the present invention as the bonding material contains Si (silicon) element and preferably contains at least one selected from the group consisting of alkali earth metals, Y (yttrium), lanthanoid, Zr (zirconium), Ti (titanium), Fe (iron), Co (cobalt), Ni (nickel), and Al (aluminum). Of these, the oxide containing an alkali earth metal, Ti (titanium), or Al (aluminum) is preferable, and the oxide containing Mg (magnesium), Sr (strontium), or Al (aluminum) is particularly preferable. Two or more kinds of bonding materials may be used. At this time, for example, in the case of a bonding material of an oxide of Al and Si, though single oxides ($Al_2O_3$, $SiO_2$) may be used as the raw materials, a composite oxide of Al and Si maybe used as the raw material. The use of a composite oxide as a raw material tends to have better homogeneity.

Since the bonding material melts during firing to cling to the silicon carbide particles and plays a role of bonding the particles together, the appropriate additive amount closely relates to the surface area of the silicon carbide particles. For the surface area of the silicon carbide particle in this case, since the state that the bonding material melt and covers the particles for adhesion is discussed, generally, the geometric surface area $S=4\pi r^2$ (r is ½ of the average particle diameter of the silicon carbide particles), where the silicon carbide particles are regarded as spheres, is more appropriate rather than the so-called BET specific surface area though it also depends on the particle shape and the like. By the use of the geometric surface area $S=4\pi r^2$, the "amount W of the bonding material per silicon carbide particle unit surface area" can easily be calculated.

$$W=(\text{mass ratio of bonding material})/[(\text{mass ratio of silicon carbide particles})/(4/3\pi r^3 \times \rho) \times (4\pi r^2)]$$

(Here, r denotes ½ of the average particle diameter of the silicon carbide particles, and ρ denotes the specific gravity of the silicon carbide particles.

In the present invention, the content of the bonding material is preferably set so that the "bonding material amount W per silicon carbide particle unit surface area" is 0.5 g/m² or more and less than 3.0 g/m². When it is below 0.5 g/m², the bonding material is insufficient, it tends to be impossible to obtain strength capable of maintaining a thin wall structure such as a honeycomb structure, and a possibility of collapse tends to increase. In reverse, when it is 3.0 g/m² or more, since the bonding material is present more than necessary for appropriately bonding silicon carbide particles, the heat capacity tends to decrease though the strength is improved, and, further, bad effects such as the decrease of the porosity and decrease of the average pore diameter tend to be caused in combination.

[3. Silicon Carbide Porous Article]

The silicon carbide porous article preferably has a structure where the silicon carbide particles are bonded with a bonding material in a state that the raw material particle shape is retained as the microstructure. In addition, in the case that a silicon carbide porous article of the present invention is used as a filter for trapping and removing the particulate matter contained in a dust-containing fluid, the open porosity is preferably 30 to 75%. When the open porosity of the honeycomb structure is less than 30%, the filtration speed is insufficient, and, when it is above 75%, strength as the structure is insufficient. Further, when it is used for the usage where there is concern about pressure loss such as an automobile exhaust gas purification filter, the open porosity is preferably 40% or more.

Likewise, in the case that a silicon carbide porous article of the present invention is used as a filter, the average pore diameter of the honeycomb structure is preferably determined according to the target to be filtered. For example, when it is used as a diesel particulate filter (DPF) for trapping and removing particulate matter contained in exhaust gas discharged from a diesel engine, the average pore diameter is preferably within the range from 5 to 50 μm. When the average pore diameter is below 5 μm, the pressure loss remarkably increases even with a small amount of deposition of particulate matter, and, in reverse, when it is above 50 μm, passing through of the particulate matter is caused, which are not preferable.

Though the bonding material may be in a vitreous or crystal state, it preferably contains a crystal phase. It is preferable that the main crystal phase of the oxide is cordierite, aluminum titanate ($Al_2TiO_5$), mullite, zircon, anorthite, strontium feldspar, and sialon.

[4. Others]

In order to smoothly extruding clay containing silicon carbide particles as the aggregate with a bonding material and a pore former and the like as necessary being blended therein into a honeycomb shape, it is preferable to add at least one kind of an organic binder as a forming auxiliary at 2 mass % or more as a superaddition with respect to the total amount of the main raw materials (silicon carbide particle raw material and bonding material). However, since addition of above 30 mass % causes excessive high porosity after calcination, strength becomes insufficient, which is not preferable.

Further, in the case of extrusion forming to obtain a honeycomb structure having a partition wall thickness of 20 mil (508 μm) or less, the addition is preferably within the range from 4 to 20 mass %. When the additive amount is less than 4 mass %, it is difficult to extrude the clay to have such thin walls, and, in reverse, when it is above 20 mass %, it is difficult to maintain the shape after the extrusion.

When the honeycomb structure is used as a filter, in order to adjust the open porosity and the average pore size, a pore former may be added upon preparing the clay. The additive amount of the pore former is preferably 30 mass % or less as a superaddition with respect to the total amount of the main raw material (silicon carbide particles and bonding material). When the additive mount is above 30 mass %, the porosity becomes excessively high to have insufficient strength. Since pores are formed in the locations of the combusted pore former, it is preferable to use a pore former having an average particle diameter of 25 to 100% with respect to the average pore size to be obtained after the firing. In order to obtain a desired open porosity and a desired average pore size, the amount of the pore former and the average particle diameter of the pore former can suitably be selected. As the pore former, an organic substance such as starch, water-absorbing resin, spherical polymer, or graphite, or a high-bulk inorganic substance such as Silas balloon, fly ash balloon, or silica gel.

[5. Manufacturing Method]

In the first place, the aforementioned raw materials are mixed and kneaded. At this time, in order to improve dispersibility of the bonding material, the average particle diameter of the bonding material is adjusted to 0.1 μm to 10 μm, more preferably 0.5 μm to 5 μm. When it is larger than 5 μm, the dispersibility tends to be deteriorated. On the other hand, when it is smaller than 0.5 μm, aggregation tends to be caused. In the case that the aggregation is caused and that the dispersibility is deteriorated, the bonding material is dispersed in water. At this time, an auxiliary of a surfactant or the like such as laurate, carboxymethyl cellulose, or polyoxyalkyl ether is added in order to improve dispersibility. Alternatively, the aggregation may be mechanically crushed by the use of a pulverizer.

The clay obtained as described above is formed into a desired honeycomb shape by an extrusion-forming method or the like. Next, after the formed article is calcined to remove (degrease) an organic binder contained in the formed article, the main firing is performed. The calcination is preferably performed at temperature lower than the temperature where the bonding material melts. Specifically, predetermined temperature between about 150 to 700° C. may temporarily be maintained, or a temperature-rising rate may be made as slow as 50° C./hr or less.

In the method for temporarily maintain the predetermined temperature, the temperature may be maintained at one temperature level or at a plurality of temperature levels depending on the kind and the amount of the organic binder used. Further, in the case that temperature is kept at a plurality of temperature levels, the retention time may be the same or varied. Also, in the method for slowing down the temperature-rising speed, likewise, the speed may be slowed only in one temperature range or in a plurality of temperature ranges. Further, in the case that speed is slowed in a plurality of temperature ranges, the rate may be the same or varied.

The atmosphere for the calcination may be an oxidation atmosphere. However, in the case that a large amount of organic binder is contained in the formed article, the binder and the like may severely be combusted during calcination to sharply raise the temperature of the formed article. Therefore, calcining in an inert atmosphere such as $N_2$ or Ar is also a preferable method in order to suppress extraordinary temperature rise of the formed article. The inhibition of the extraordinary temperature rise is an important control in the case that a raw material having a large thermal expansion coefficient (susceptible to thermal shock) is used. When, for example, the organic binder is added to the main raw material by 20 mass % (superaddition) or more with respect to the main raw material, calcination in the aforementioned inert atmosphere is preferable.

The calcination and the subsequent main firing may be performed in the same furnace or in the different furnaces as different steps. Alternatively, they may be performed in the same furnace in successive steps. In the case that the calcination and the main firing are performed indifferent atmospheres, the former is a preferable method. However, from the viewpoints of total firing time, furnace-driving costs, and the like, the latter method is also preferable.

Though the temperature of the main firing depends on the bonding material employed, generally, the temperature is preferably within the range from 1100 to 1600° C. When the temperature for the main firing is below 1100° C., since the bonding material does not melt sufficiently, the silicon carbide particles are not bonded firmly. In reverse, when the temperature is above 1600° C., a part of the bonding material is evaporated to cause a lack of the bonding portion, which is not preferable.

In addition, regarding the atmosphere in the main firing, since it is feared that SiC is oxidized at high temperature, the atmosphere is preferably an inert gas atmosphere or a reduced-pressure atmosphere of $N_2$, Ar, or the like having an oxygen partial pressure of $10^{-4}$ atm or less in at least the temperature range of not lower than the temperature where the oxidation start.

Generally, upon extrusion forming of a honeycomb structure, a mixture of two or more kinds of raw material powders having a difference in particle size can be extruded smoothly. From the viewpoint, it is preferable that the average particle diameter of the bonding material is 30% or less of the average particle diameter of the silicon carbide particles functioning as the aggregate.

EXAMPLE

Hereinbelow, the present invention is described specifically on the basis of Examples. However, the present invention is by no means limited to the Examples.

Example 1

There were uniformly mixed and kneaded 98 parts by mass of SiC raw material powder having an average particle diameter of 50.0 μm, 2 parts by mass of bonding materials ($SiO_2$, SrO, $Al_2O_3$) having an average particle diameter of 1.2 μm, 6 parts by mass of methyl cellulose as an organic binder, 5 parts by mass of starch as a pore former, 2.5 parts by mass of a surfactant, and 35 parts by mass of water. At this time, a bonding material and a surfactant were added to 20 parts by mass of water in advance and uniformly dispersed with a homogenizer. The clay thus obtained was formed into a honeycomb shape having an outer diameter of 35 mm, a length of 170 mm, a partition wall thickness of 0.3 mm, and a cell density of 300 cells/sq. in. (48 cells/cm$^2$) with an extruder. After the honeycomb formed article was subjected to calcination for degreasing at 450° C. for 5 hours in an oxidation atmosphere, firing was performed at 1450° C. for 2.5 hours in a non-oxidation atmosphere to manufacture a porous honeycomb-structured silicon carbide sintered article. The sintered article was evaluated, and the results are shown in Table 1.

Examples 2 to 10, Comparative Examples 1 to 3

The Examples 2 to 10 and the Comparative Examples 1 to 3 were obtained in the same manner as in Example 1 except that the composition of the oxide, average particle size of the SiC powder, compounding ratio of SiC powder, additive amount of the pore former, main phase of the oxide, and firing temperature were as shown in Table 1. The results are shown in Table 1.

[Evaluation Method of Each Item]

Average particle diameter [μm] of SiC powder: It was measured by the laser diffraction (JIS-R1629).

Surface area [m$^2$] of SiC powder: The SiC powder was approximated to a sphere to calculate the surface area from the average particle diameter.

Average pore size [μm]: It was measured by the mercury porosimetry (JIS-R1655).

Porosity [%]: It was measured by the Archimedes method (JIS R 1634).

Crystal phase: It was identified by a powder X-ray diffraction method. Specifically, (1) the XRD of mixed powder consisted of SiC and crystal phase which ratio (mass ratio) calculated from the additive amount of the oxide powder was measured to measure a peak area of a crystal phase, (2) the XRD of the sample manufactured was measured to measure a peak area of the crystal phase produced, (3) the peak area of (1) was compared with that of (2) to calculate the mass of the crystal phase in the sample manufactured.

Heat capacity [J/K/cm$^3$]: It was measured by the laser flash method (JIS-R1611) (value at a measurement temperature of 600° C.).

Thermal diffusivity [cm$^2$/s]: It was measured by the laser flash method (JIS-R1611) (value at a measurement temperature of 600° C.)

TABLE 1-1

| | Example 1 | Example 2 | Example 3 | Example 4 | Example 5 | Example 6 | Example 7 |
|---|---|---|---|---|---|---|---|
| Oxide composition | $SiO_2$ | $SiO_2$ | $SiO_2$ | $SiO_2$ | $SiO_2$ | $SiO_2$ | $SiO_2$ |
| | SrO | SrO | SrO | SrO | MgO | CaO | $ZrO_2$ |
| | $Al_2O_3$ | $Al_2O_3$ | $Al_2O_3$ | $Al_2O_3$ | $Al_2O_3$ | $Al_2O_3$ | $Al_2O_3$ |
| Average particle diameter of SiC powder [μm] | 50 | 50 | 13 | 50 | 50 | 50 | 50 |
| Compounding ratio of SiC powder [parts by mass] | 98 | 90 | 80 | 90 | 90 | 90 | 90 |
| Compounding ratio of oxide powder [parts by mass] | 2 | 10 | 20 | 10 | 10 | 10 | 10 |
| Additive amount of oxide powder/surface area of SiC powder [g/m$^2$] | 0.5 | 2.9 | 1.7 | 2.9 | 2.9 | 2.9 | 2.9 |
| Additive amount of pore former [parts by mass] | 5 | 0 | 20 | 5 | 5 | 5 | 5 |
| Firing temperature [° C.] | 1450 | 1200 | 1450 | 1450 | 1450 | 1450 | 1450 |
| Average pore size [μm] | 10 | 11 | 30 | 10 | 11 | 11 | 11 |
| Porosity [%] | 50 | 35 | 62 | 48 | 46 | 46 | 51 |
| Main crystal phase | — | — | — | Mullite | Cordierite | Anorthite | Zircon |
| Weight of crystal phase/additive amount of oxide power [%] | 0 | 0 | 0 | 32 | 98 | 91 | 43 |
| Heat capacity [J/K/cm$^3$] | 3.72 | 3.68 | 3.70 | 3.70 | 3.69 | 3.69 | 3.70 |
| Thermal diffusivity [m$^2$/s] | 1.5E−06 | 1.8E−06 | 5.0E−07 | 2.5E−06 | 3.6E−06 | 3.2E−06 | 2.2E−06 |

TABLE 1-1

|  | Example 8 | Example 9 | Example 10 | Comp. Ex. 1 | Comp. Ex. 2 | Comp. Ex. 3 |
|---|---|---|---|---|---|---|
| Oxide composition | $SiO_2$ | $SiO_2$ | $SiO_2$ | $SiO_2$ | $SiO_2$ | Si |
|  | $Fe_2O_3$ | $TiO_2$ | $TiO_2$ | SrO | SrO |  |
|  | $Al_2O_3$ | $Al_2O_3$ | $Al_2O_3$ | $Al_2O_3$ | $Al_2O_3$ |  |
| Average particle diameter of SiC powder [μm] | 50 | 50 | 50 | 50 | 50 | 50 |
| Compounding ratio of SiC powder [parts by mass] | 90 | 90 | 90 | 85 | 99 | 80 |
| Compounding ratio of oxide powder [parts by mass] | 10 | 10 | 10 | 15 | 1 | 20 |
| Additive amount of oxide powder/surface area of SiC powder [g/m$^2$] | 2.9 | 2.9 | 2.9 | 4.7 | 0.3 | 6.6 |
| Additive amount of pore former [parts by mass] | 5 | 5 | 5 | 8 | 0 | 8 |
| Firing temperature [° C.] | 1450 | 1450 | 1450 | 1200 | 1450 | 1450 |
| Average pore size [μm] | 11 | 11 | 10 | 20 | collapsed | 11 |
| Porosity [%] | 53 | 53 | 54 | 29 |  | 48 |
| Main crystal phase | Sialon | Mullite, Rutile | Mullite, aluminum titanate | — |  | Si |
| Weight of crystal phase/additive amount of oxide power [%] | 56 | 83 | 58 | 0 |  | — |
| Heat capacity [J/K/cm$^3$] | 3.70 | 3.70 | 3.70 | 3.61 |  | 3.33 |
| Thermal diffusivity [m$^2$/s] | 2.8E−06 | 3.2E−06 | 2.6E−06 | 1.8E−06 |  | 7.1E−06 |

From the Table 1, it is understood that, as the amount of the bonding material is decreased, the heat capacity is increased, and the porosity rises in the order of Comparative Example 1, Example 2, and Example 1. However, the amount of the bonding material is less than the specified range of the present invention (Comparative Example 2), it is understood that the silicon carbide porous article is collapsed. In addition, as is clear from the comparison of Examples 1 to 3 with Examples 4 to 10, the articles containing a crystal phase (Example 4 to 10) is excellent in thermal diffusivity. Further, it is understood, from Examples 1 to 10 and Comparative Example 3, that a silicon carbide porous article where a specific bonding material of the present invention was employed has a large heat capacity in comparison with the article where the bonding material (Si) other than the bonding material of the present invention was employed.

INDUSTRIAL APPLICABILITY

A silicon carbide porous article of the present invention can suitably be used for a DPF (diesel particulate filter).

The invention claimed is:

1. A honeycomb structure constituted of a silicon carbide porous article containing silicon carbide particles as an aggregate and an oxide as a bonding material, wherein the silicon carbide particles are bonded together by the bonding material such that the shape of the silicon carbide particles and pores formed among the silicon carbide particles are retained, an additive amount of the oxide is 0.5 g/m$^2$ or more and less than or equal to 2.9 g/m$^2$ with respect to a surface area of the silicon carbide particles, and the oxide includes a Si (silicon) element and at least a Sr (strontium) element.

2. The honeycomb structure according to claim 1, wherein the oxide includes at least one selected from the group consisting of alkali earth metals, Y (yttrium), lanthanoid, Zr (zirconium), Ti (titanium), Fe (iron), Co (cobalt), Ni (nickel), and Al (aluminum).

3. The honeycomb structure according to claim 1, wherein the oxide contains a crystal phase which is aluminum titanate ($Al_2TiO_5$), mullite, zircon, anorthite, strontium feldspar, and sialon.

4. The honeycomb structure according to claim 1, wherein the pores have an open porosity of 30 to 75%.

5. The honeycomb structure according to claim 1, wherein the pores have an average pore diameter of 5 to 50 μm.

6. A method for manufacturing a silicon carbide porous article according to claim 1, wherein, after an oxide raw material is added to a silicon carbide particle raw material and mixed, firing is performed at 1100 to 1600° C.

7. The honeycomb structure according to claim 2, wherein the oxide contains a crystal phase which is aluminum titanate ($Al_2TiO_5$), mullite, zircon, anorthite, strontium feldspar, and sialon.

8. The honeycomb structure according to claim 2, wherein the pores have an open porosity of 30 to 75%.

9. The honeycomb structure according to claim 3, wherein the pores have an open porosity of 30 to 75%.

10. The honeycomb structure according to claim 7, wherein the pores have an open porosity of 30 to 75%.

11. The honeycomb structure according to claim 2, wherein the pores have an average pore diameter of 5 to 50 μm.

12. The honeycomb structure according to claim 3, wherein the pores have an average pore diameter of 5 to 50 μm.

13. The honeycomb structure according to claim 4, wherein the pores have an average pore diameter of 5 to 50 μm.

14. The honeycomb structure according to claim 7, wherein the pores have an average pore diameter of 5 to 50 μm.

15. The honeycomb structure according to claim 8, wherein the pores have an average pore diameter of 5 to 50 μm.

16. The honeycomb structure according to claim 9, wherein the pores have an average pore diameter of 5 to 50 μm.

17. The honeycomb structure according to claim 10, wherein the pores have an average pore diameter of 5 to 50 μm.

18. The honeycomb structure according to claim 8, wherein a heat capacity of the honeycomb structure is within a range of 3.68-3.72 J/K/cm$^3$.

* * * * *